United States Patent
Wu (10) Patent No.: US 12,086,123 B2
(45) Date of Patent: Sep. 10, 2024

(54) GENERIC INDEX FOR PROTOBUF DATA

(71) Applicant: Google LLC, Mountain View, CA (US)

(72) Inventor: Hui Wu, San Jose, CA (US)

(73) Assignee: Google LLC, Mountain View, CA (US)

( * ) Notice: Subject to any disclaimer, the term of this patent is extended or adjusted under 35 U.S.C. 154(b) by 28 days.

(21) Appl. No.: 17/841,874

(22) Filed: Jun. 16, 2022

(65) Prior Publication Data

US 2023/0409550 A1  Dec. 21, 2023

(51) Int. Cl.
*G06F 16/22* (2019.01)
*G06F 16/248* (2019.01)

(52) U.S. Cl.
CPC ...... *G06F 16/2272* (2019.01); *G06F 16/2246* (2019.01); *G06F 16/248* (2019.01)

(58) Field of Classification Search
CPC ............ G06F 16/248; G06F 16/2246; G06F 16/2272; G06F 16/2228; G06F 16/9038; G06F 16/338
USPC .................. 707/711, 723, 741, 748
See application file for complete search history.

(56) References Cited

U.S. PATENT DOCUMENTS

| | | | | |
|---|---|---|---|---|
| 6,636,845 B2* | 10/2003 | Chau | | G06F 16/86 707/999.001 |
| 7,363,310 B2* | 4/2008 | Schnelle | | G06F 16/86 707/999.102 |
| 10,511,515 B1* | 12/2019 | Ehlinger | | H04L 43/045 |
| 11,176,202 B2* | 11/2021 | Rodriguez | | G06F 16/90344 |
| 2009/0144266 A1* | 6/2009 | Bicioglu | | G06F 16/3338 707/999.005 |
| 2013/0086127 A1* | 4/2013 | Pogmore | | H04L 9/0869 707/825 |
| 2014/0244300 A1* | 8/2014 | Bess | | G06F 16/22 705/3 |
| 2014/0280374 A1* | 9/2014 | Hicklin | | G06F 16/252 707/803 |
| 2018/0324198 A1* | 11/2018 | Borthakur | | G06F 8/61 |

FOREIGN PATENT DOCUMENTS

CN        107092656 B     12/2019

OTHER PUBLICATIONS

Anonymous. Database index—Wikipedia. Oct. 20, 2015 (Oct. 20, 2015), Retrieved from the Internet: <https://en.wikipedia.org/w/index.php?title=Database_index&oldid=686651483>. [retrieved on Feb. 9, 2023], 6 pages.
International Search Report and Written Opinion for International Application No. PCT/US2023/018897 dated Aug. 4, 2023. 15 pages.

(Continued)

*Primary Examiner* — Phong H Nguyen
(74) *Attorney, Agent, or Firm* — Lerner David LLP (57) ABSTRACT

Aspects of the disclosure are directed to an approach for building a generic framework to allow protocol buffer data to be fully text searchable and matched fields to be quickly identified. The approach includes converting protocol buffer data from a tree structure into a field-value pair structure. The field-value pair structure can represent any protocol buffer and any new protocol buffer definition change can be adopted automatically. The approach further includes building a reverse index at a record level, which can immediately indicate the fields for each token.

20 Claims, 8 Drawing Sheets

(56) References Cited

OTHER PUBLICATIONS

Zafari et al. XLight, An Efficient Relational Schema to Store and Query XML Data. Data Storage and Data Engineering (DSDE), 2010 International Conference On, IEEE, Piscataway, NJ, USA, Feb. 9, 2010 (Feb. 9, 2010), pp. 254-257.
GitHub. Files for building search index of xkcd.com web comics—from Exercise 4.12 in The Go Programming Language. Jun. 16, 2019. 4 pages. Retrieved from the Internet: <https://github.com/ggarcia209/tgpl_xkcd>.
Lin et al. Data-Intensive Text Processing with MapReduce. May 2010. Morgan & Claypool Publishers. 177 pages. Retrieved from the Internet: <http://www.iro.umontreal.ca/~nie/IFT6255/Books/MapReduce.pdf>.

\* cited by examiner

GENERIC INDEX FOR PROTOBUF DATA

BACKGROUND

Protocol buffers are a language-neutral, platform-neutral, extensible mechanism for serializing structured data that can be helpful in developing programs to communicate with each other over a network or to store data. Protocol buffers generally involve an interface description language that describes the structure of some data and a program that generates source code from that description for generating or parsing a stream of bytes that represents the structured data.

Indexing protocol buffer data can require listing all the fields that need to be indexed. However, if the protocol buffer has a large number of fields, listing all of those fields can be demanding. Further, a protocol buffer definition can be changed at any time, which can cause inconsistencies between the data schema and the protocol buffer definition. Identifying the location of matched fields can also be highly difficult.

BRIEF SUMMARY

Aspects of the disclosure are directed to an approach for building a generic framework to allow protocol buffer data to be fully text searchable and matched fields to be quickly identified. The approach includes converting protocol buffer data from a tree structure into a field-value pair structure. The field-value pair structure can represent any protocol buffer and any new protocol buffer definition change can be adopted automatically. The approach further includes building a reverse index at a record level, which can immediately indicate the fields for each token.

An aspect of the disclosure provides for a method for searching protocol buffer data. The method includes converting, with one or more processors, protocol buffer data from a tree structure into a field-value pair structure. A field portion of each field-value pair represents leaf fields of the tree structure and a value portion of each field-value pair represents one or more terms appearing in the respective field. The method further includes generating, with the one or more processors, a reverse index of the field-value pairs. The reverse index includes a term-to-field list that maps the terms with the respective fields in which they appear.

In an example, the method further includes generating, with the one or more processors, a search result based on the generated reverse index. In another example, the field portion of each field-value pair is a field index. In yet another example, the field index includes one of an integer key or a string of characters.

In yet another example, the method further includes generating, with the one or more processors, a weight for the field portion of each field-value pair based on the respective value portion. In yet another example, the method further includes determining, with the one or more processors, a ranking score for a search result based on a summation of weights generated for the field portion of field-value pairs related to the search.

In yet another example, the method further includes highlighting, with the one or more processors, matched terms in a search result based on the generated reverse index. In yet another example, the method further includes highlighting, with the one or more processors, related terms in a search result based on the generated reverse index.

Another aspect of the disclosure provides for a system including one or more processors; and one or more storage devices coupled to the one or more processors and storing instructions that, when executed by the one or more processors, causes the one or more processors to perform operations for searching protocol buffer data. The operations include converting protocol buffer data from a tree structure into a field-value pair structure. A field portion of each field-value pair represents leaf fields of the tree structure and a value portion of each field-value pair represents one or more terms appearing in the respective field. The operations further include generating a reverse index of the field-value pairs. The reverse index includes a term-to-field list that maps the terms with the respective fields in which they appear.

In an example, the operations further include generating a search result based on the generated reverse index. In another example, the field portion of each field-value pair is a field index, where the field index includes one of an integer key or a string of characters.

In yet another example, the operations further include generating a weight for the field portion of each field-value pair based on the respective value portion. In yet another example, the operations further include determining a ranking score for a search result based on a summation of weights generated for the field portion of field-value pairs related to the search. In yet another example, the operations further include highlighting at least one of matched terms or related terms in a search result based on the generated reverse index.

Yet another aspect of the disclosure provides for a non-transitory computer readable medium for storing instructions that, when executed by one or more processors, causes the one or more processors to perform operations for searching protocol buffer data. The operations include converting protocol buffer data from a tree structure into a field-value pair structure. A field portion of each field-value pair represents leaf fields of the tree structure and a value portion of each field-value pair represents one or more terms appearing in the respective field. The operations further include generating a reverse index of the field-value pairs. The reverse index includes a term-to-field list that maps the terms with the respective fields in which they appear.

In an example, the operations further include generating a search result based on the generated reverse index. In another example, the field portion of each field-value pair is a field index, where the field index includes one of an integer key or a string of characters.

In yet another example, the operations further include generating a weight for the field portion of each field-value pair based on the respective value portion. In yet another example, the operations further include determining a ranking score for a search result based on a summation of weights generated for the field portion of field-value pairs related to the search. In yet another example, the operations further include highlighting at least one of matched terms or related terms in a search result based on the generated reverse index.

DETAILED DESCRIPTION

Generally disclosed herein are implementations for building a generic framework to search protocol buffer data. The generic framework can allow for unified indexing so that any protocol buffer data is text searchable. The generic framework can also allow for quickly identifying matched fields of protocol buffer data for queries or query expansions. Protocol buffers generally can support more data types than JavaScript Object Notation (JSON) or extensible markup language (XML).

Building the generic framework can include converting protocol buffer data from a tree structure into a field-value pair structure. The field-value pair structure can represent any protocol buffer and any new protocol buffer definition change can be adopted automatically based on a new protocol buffer schema and its associated values. Data types supported by protocol buffers but not supported by other data formats can be converted into the field-value pair structure. The field-value pair can include a field portion and a value portion. The field portion can be a field index representing leaf fields of the tree structure. The field portion can be a string of characters or, to save storage space, integer keys, such as Int32. The value portion can be entries for the field and include one or more terms appearing in a respective field.

Building the generic framework can further include generating a reverse index at a record level of a database to immediately identify fields for each term of the values. Data types supported by protocol buffers but not supported by other data formats can be incorporated into the reverse index. A reverse index can reverse entries before they are entered in the index, for example, terms can be listed before the field portion. The reverse index can include a term-to-field list that maps terms of the values with the field indexes in which they appear.

Field indexes can be ranked or given a weight based on their value for more accurate search results. For example, more important fields, such as entity titles, can be given higher weights than less important fields, such as comments. When searching, a ranking score can be determined that is a summation of the weights for each field in which the search term is included. The ranking score can be generated by using the weights for each weight through a mathematical model, such as a linear model.

Matched terms and/or related terms can be highlighted based on the reverse index for more accurate search results. Matched terms are terms that are partially or exactly equivalent to terms in a query. Related terms are terms that are associated with terms in a query. Based on a query, the matched and/or related terms can be determined. The reverse index can show in which fields matched and/or related terms from the query appear.

Figure 1:
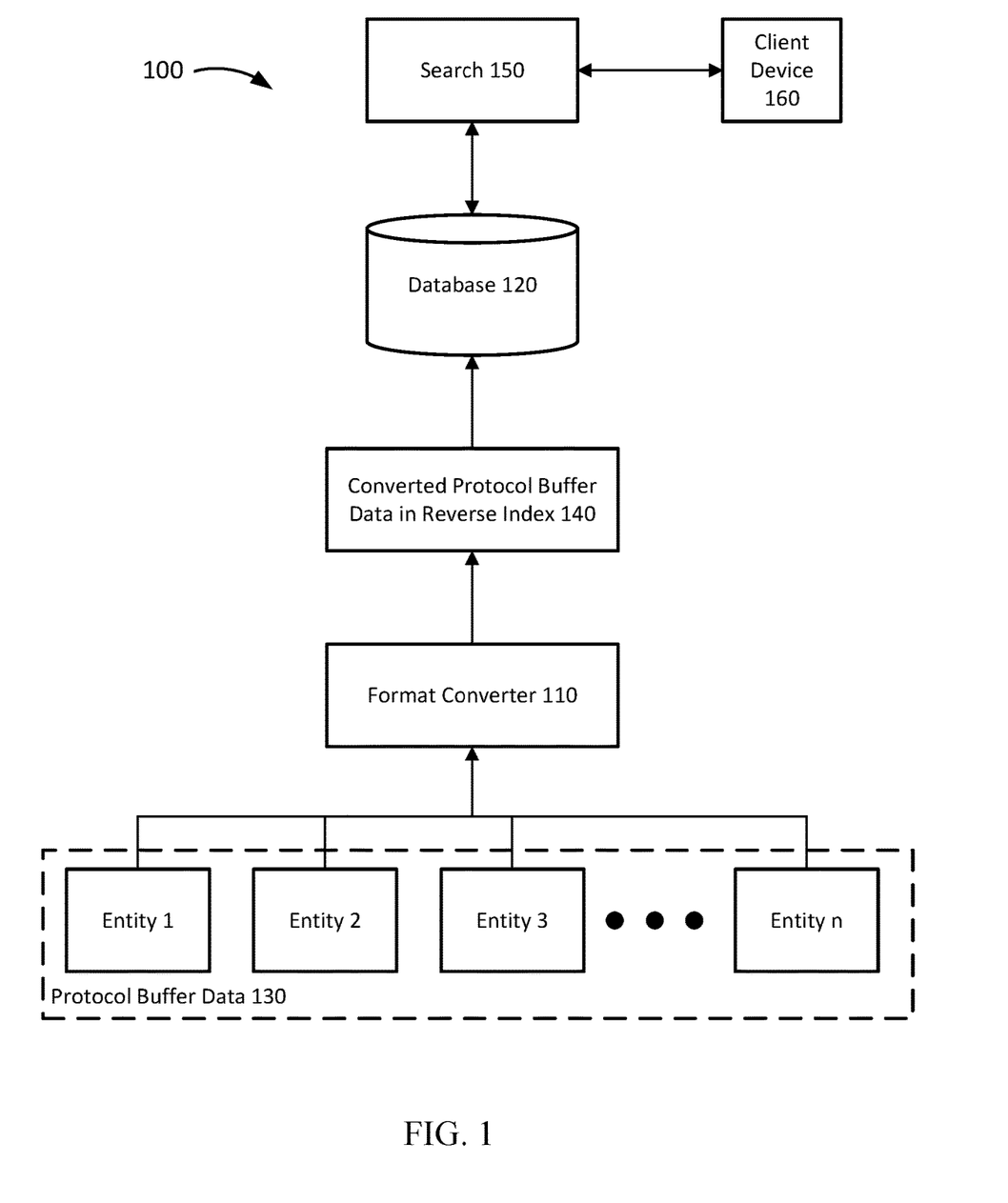
FIG. 1 depicts a block diagram of a system to build a generic framework for searching protocol buffer data according to aspects of the disclosure.

FIG. 1 depicts a block diagram of a system 100 to build a generic framework for searching protocol buffer data. The system can include a format converter 110 and a database 120. The format converter 110 can receive protocol buffer data 130 as one or more entities, each in a tree structure. The format converter 110 can convert the protocol buffer data 130 from the tree structures into field-value pair structures and generate a reverse index for the converted protocol buffer data 140, to be described in further detail below. The reverse index of the converted protocol buffer data 140 can be stored in the database 120, where the protocol buffer data 140 can be text searchable for a search 150 from a client device 160.

The database 120 can be a single storage device or a plurality of storage devices, such as hard drives, random access memory, disks, disk arrays, tape drives, etc. The database 120 can implement any of a number of architectures and technologies, including, but not limited to, direct attached storage (DAS), network attached storage (NAS), storage area networks (SANs), fiber channel (FC), fiber channel over Ethernet (FCoE), mixed architecture networks, or the like. Further, in some examples the database 120 can include virtualized or containerized environments. For example, the database 120 can include one or more virtual machines running on a host machine. The database 120 can store, for example, data files, documents, code, schemas, persistence frameworks, applications, or any of a variety of other information or tools typically stored in databases. While a single database is shown, the database 120 can also be a plurality of database replicas in a distributed system.

The client device 160 can be configured with a processor, memory, instructions, and data. The client device can be a personal computer, intended for use by a person having all the internal components normally found in a personal computer such as a central processing unit (CPU), hard drive, and input/output device, and all of the components used for connecting these elements to one another. The client device 160 can be any device capable of processing instructions and transmitting data to and from humans and other computers including general purpose computers, tablets, mobile phones, smartwatches, home assistants, video game systems, network computers lacking local storage capability, set top boxes for televisions, and other networked devices.

The client device 160 can include an application interface module used to search 150 the database 120. For example, the application interface module may include sub-routines, data structures, object classes and other types of software components used to allow the database 120 and client device 160 to communicate with each other. In one aspect, the application interface module may be a software module operable in conjunction with several types of operating systems known in the arts. For example, the client may be connected to a Structured Query Language (SQL) database server that may operate in conjunction with the application interface module for saving and retrieving information data.

Figure 2:
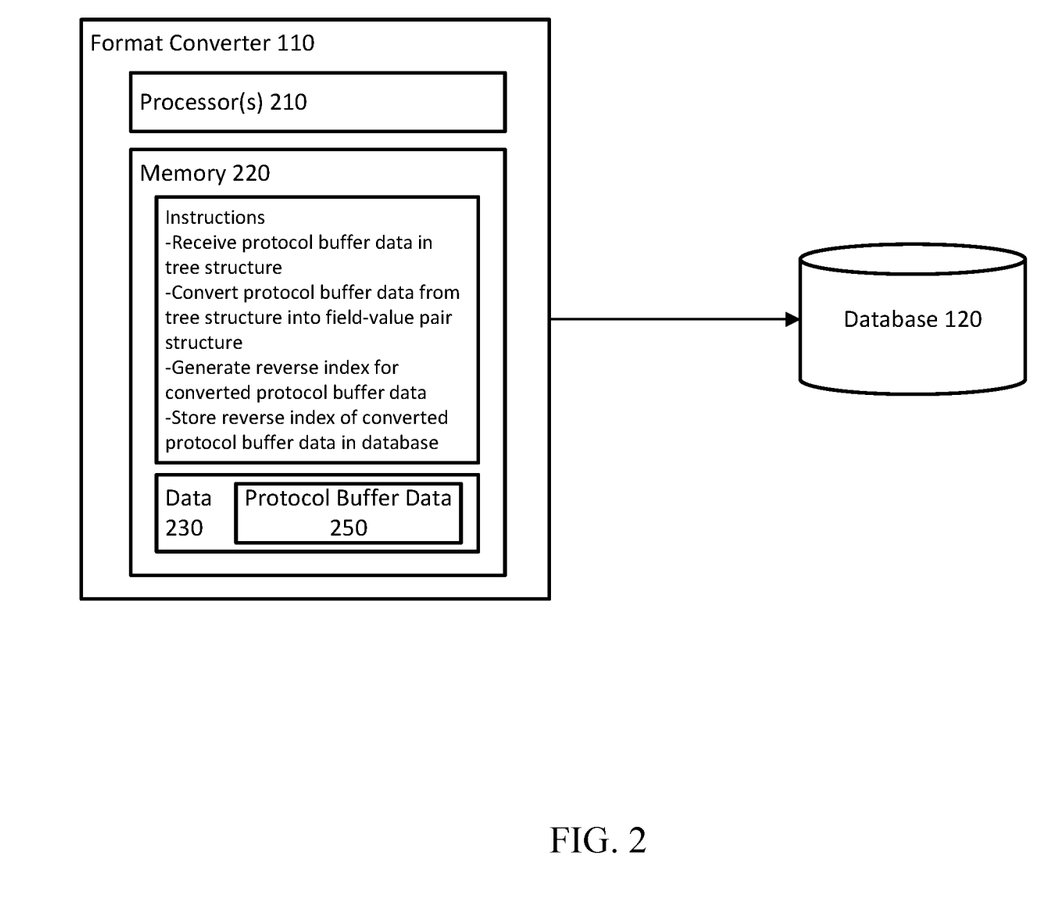
FIG. 2 depicts a block diagram further detailing the format converter of the system to build a generic framework for searching protocol buffer data according to aspects of the disclosure.

FIG. 2 depicts a block diagram further detailing the format converter 110 of the system 100 to build a generic framework for searching protocol buffer data. The format converter 110 includes a set of computing resources such as one or more processors 210 and memory 220. The processors 210 are configured to execute data 230 and instructions 240 stored in the memory 220 to convert protocol buffer data 250 from the tree structures into field-value pair structures and generate a reverse index for the converted protocol buffer data 250.

The processors 210 can be any processors, including one or more central processing units (CPUs), graphic processing units (GPUs), field programmable gate arrays (FPGAs), and/or application specific integrated circuits (ASICs). Although not necessary, the format converter 110 can include specialized hardware components to perform specific computing processes. The memory 220 can be a type of non-transitory computer readable medium capable of storing information accessible by the processor 210, such as a hard-drive, solid state drive, tape drive, optical storage, memory card, ROM, RAM, DVD, CD-ROM, write-capable, and read-only memories.

The memory 220 can store information accessible by the processor 210, including instructions 240 that can be executed by the processor 210 and that can be retrieved, manipulated, or stored by the processor 210. The instructions 240 can be a set of instructions executed directly, such as machine code, or indirectly, such as scripts, by the processor 210. In this regard, the terms "instructions", "steps", and "programs" can be used interchangeably herein. The instructions 240 can be stored in object code format for direct processing by the processor 210, or other types of computer language including scripts or collections of independent source code modules that are interpreted on demand or compiled in advance. The instructions 240 can include receiving protocol buffer data in a tree structure, converting the protocol buffer data from the tree structure into a field-value pair structure, generating a reverse index for the converted protocol buffer data, and storing the reverse index of converted protocol buffer data in the database 120. Functions, methods, and routines of the instructions are explained in more detail below.

The data 230 can be retrieved, stored, or modified by the processor 210 in accordance with the instructions. The data 230 can also be formatted in a computer-readable format such as, but not limited to, binary values, ASCII, or Unicode. Moreover, the data 230 can include information sufficient to identify relevant information, such as numbers, descriptive text, proprietary codes, pointers, references to data stored in other memories, including other network locations, or information that is used by a function to calculate relevant data. The data 230 can include the protocol buffer data 250 that is converted into the field-value pair structure to be incorporated into the reverse index.

Although FIG. 2 functionally illustrates the processor 210 and memory 220 of the format converter 110 as being within the same block, the processor 210 and/or memory 220 can actually include multiple processors or memories that may or may not be stored within the same physical housing. For example, the memory 220 can be a hard drive or other storage media located in housings different from that of the format converter 110. Accordingly, references to a processor or memory will be understood to include references to a collection of processors or memories that may or may not operate in parallel. Yet further, although some functions described below are indicated as taking place on a single computing device having a single processor, various aspects of the subject matter described herein can be implemented by a plurality of computing devices, for example, communicating information over a network.

Figure 3:
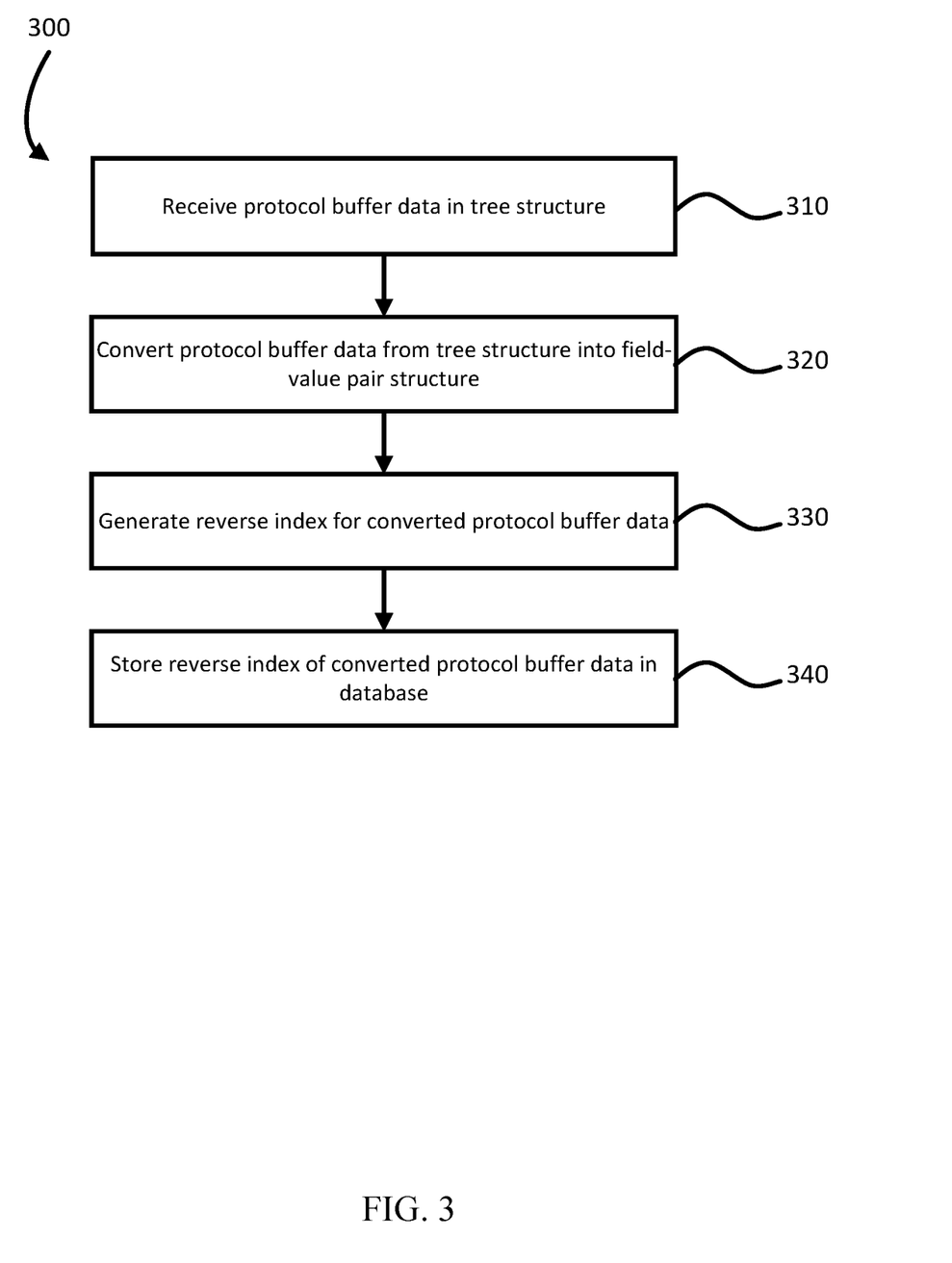
FIG. 3 depicts a flow diagram of an example process to build a generic framework for searching protocol buffer data according to aspects of the disclosure.

FIG. 3 depicts a flow diagram of an example process 300 to build a generic framework for searching protocol buffer data. The example process 300 can be performed on a system of one or more processors in one or more locations, such as the format converter 110 of FIGS. 1-2.

As shown in block 310, the format converter 110 can receive protocol buffer data 130 in a tree structure. The protocol buffer data 130 can include one or more entities, each in a tree structure.

As shown in block 320, the format converter 110 can convert the protocol buffer data 130 from the tree structure into a field-value pair structure. The field-value pair structure can represent any protocol buffer and any new protocol buffer definition change can be adopted automatically based on a new protocol buffer schema and its associated values. Data types supported by protocol buffers but not supported by other data formats can be converted into the field-value pair structure.

Figure 4:
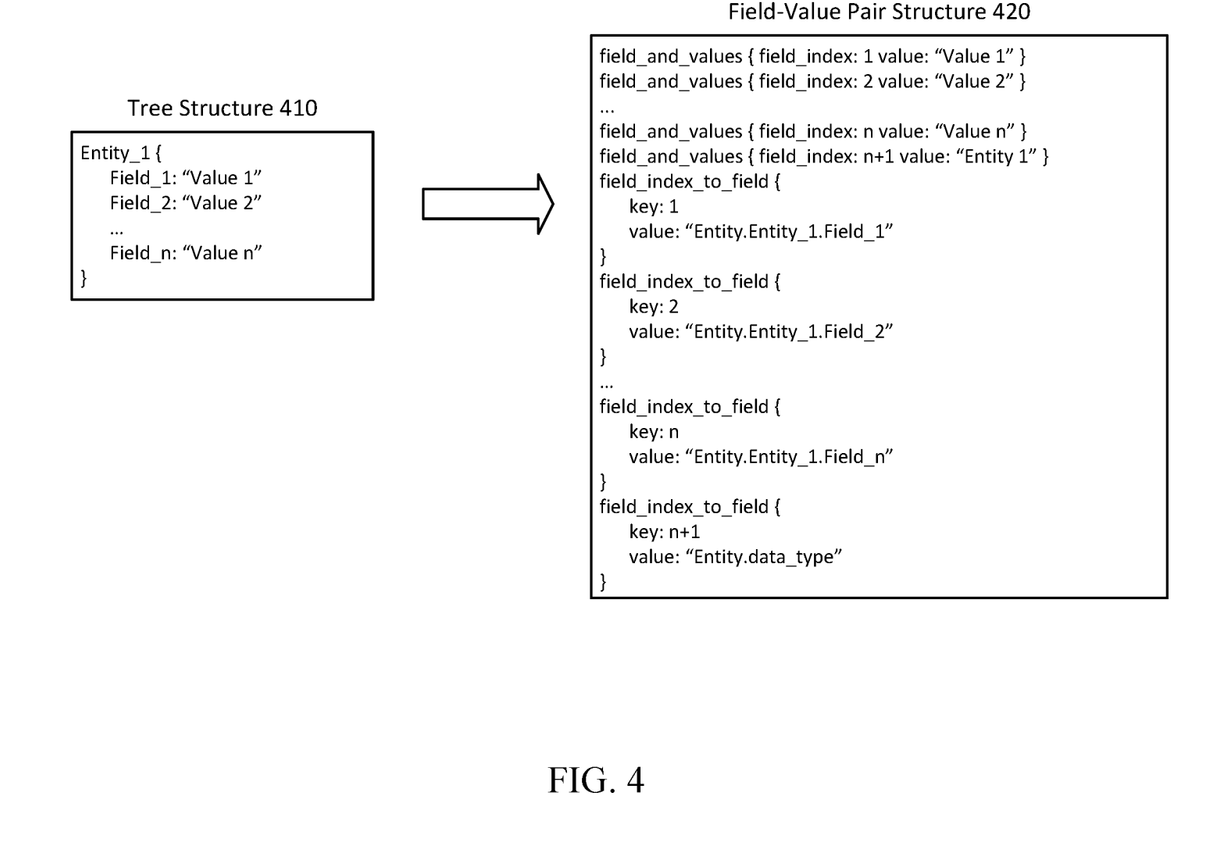
FIG. 4 depicts a block diagram of protocol buffer data in a tree structure being converted into a field-value pair structure according to aspects of the disclosure.

FIG. 4 depicts a block diagram of protocol buffer data 130 in a tree structure 410 being converted into a field-value pair structure 420. The tree structure 410 can include one or more root entities with one or more leaf fields representing values. While a single entity, e.g., Entity 1, is shown for simplicity, the tree structure 410 can include any number of entities having any number of fields. Entity 1 can include a plurality of fields, e.g., Field 1 through Field n, respectively including a plurality of values, e.g., Value 1 through Value n, as entries for the fields.

The field-value pair structure 420 can include a field portion and a value portion. The field portion can be a field index representing leaf fields of the tree structure. The field portion can be a string of characters or integer keys. Integer keys can be used to save storage space. Example integer keys can include Int16, Int32, and Int64. The plurality of fields, e.g., Field 1 through Field n, can be represented by a plurality of corresponding field indexes with integer keys, e.g., Field Index 1 through Field Index n. The data type of entity 1 can also be represented by a field index with an integer key, e.g., Field Index n+1. Protocol buffers can support data types that other data formats, like JSON and XML, cannot support.

The value portion can be entries for the field and include one or more terms appearing in a respective field. The field indexes with integer keys, e.g., Field Index 1 through Field Index n, can also represent the plurality of values, e.g., Value 1 through Value n, based on the field in which each value appears.

Figure 5:
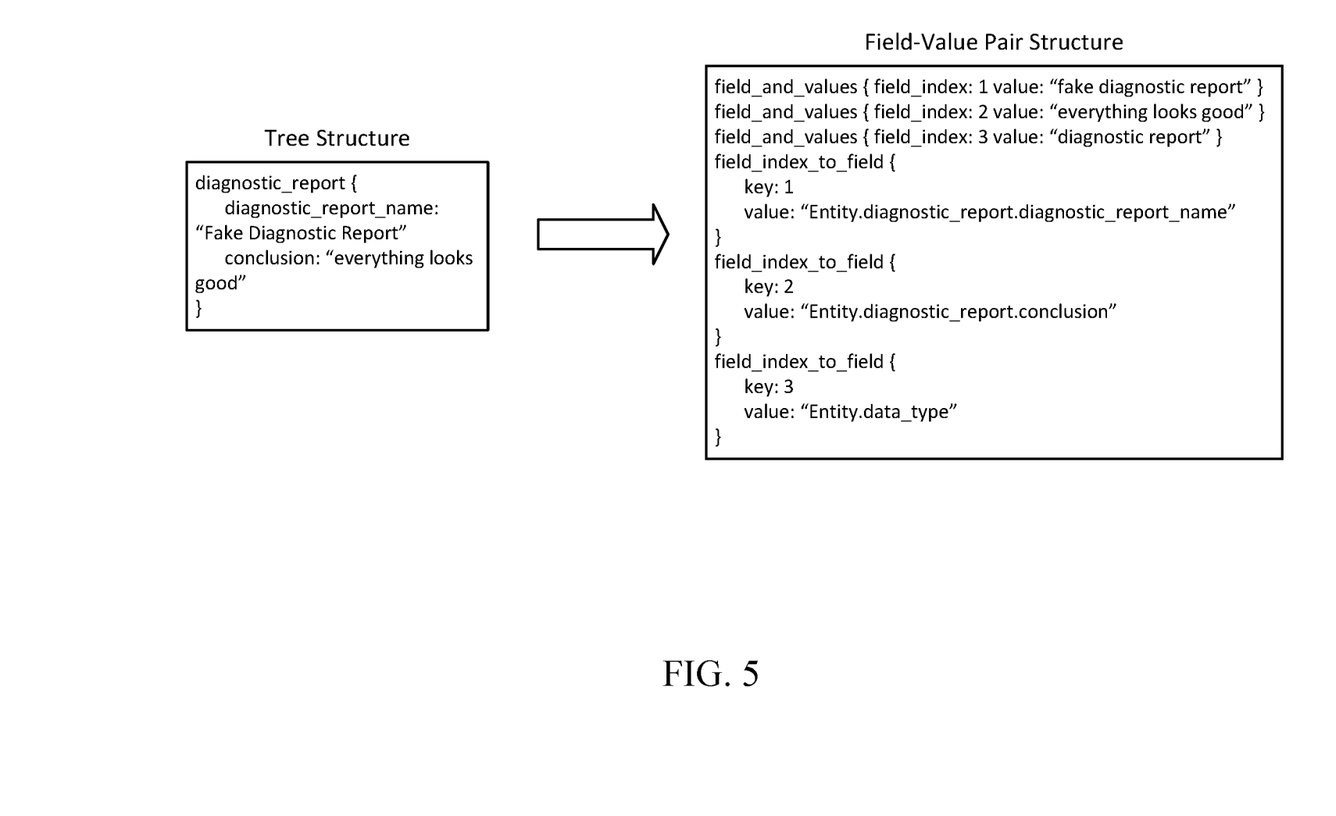
FIG. 5 depicts a block diagram of an example conversion of an entity "diagnostic report" of protocol buffer data according to aspects of the disclosure.

FIG. 5 depicts a block diagram of an example conversion of an entity "diagnostic report" of protocol buffer data. The entity can include three fields, "diagnostic report name", "conclusion", and "entity", with respective values "fake diagnostic report", "everything looks good", and "diagnostic report". This protocol buffer data can be represented as field-value pairs {1: "fake diagnostic report"}, {2: "everything looks good"}, and {3: "diagnostic report"}, where the field index can be the integer key, and the value can be the description. The integer key can further describe the field indexes so that 1 can be "diagnostic report name", 2 can be "conclusion", and 3 can be "entity". The field index can also be represented as strings instead of integer keys, so that the field-value pair can be {diagnostic report name: fake diagnostic report}, {conclusion: everything looks good}, and {entity: diagnostic report}.

Referring back to FIG. 3, as shown in block 330, the format converter 110 can generate a reverse index for the converted protocol buffer data 130. Data types supported by protocol buffers but not supported by other data formats can be incorporated into the reverse index. A reverse index can reverse entries before they are entered in the index, for example, terms can be listed before the field portion.

Figure 6:
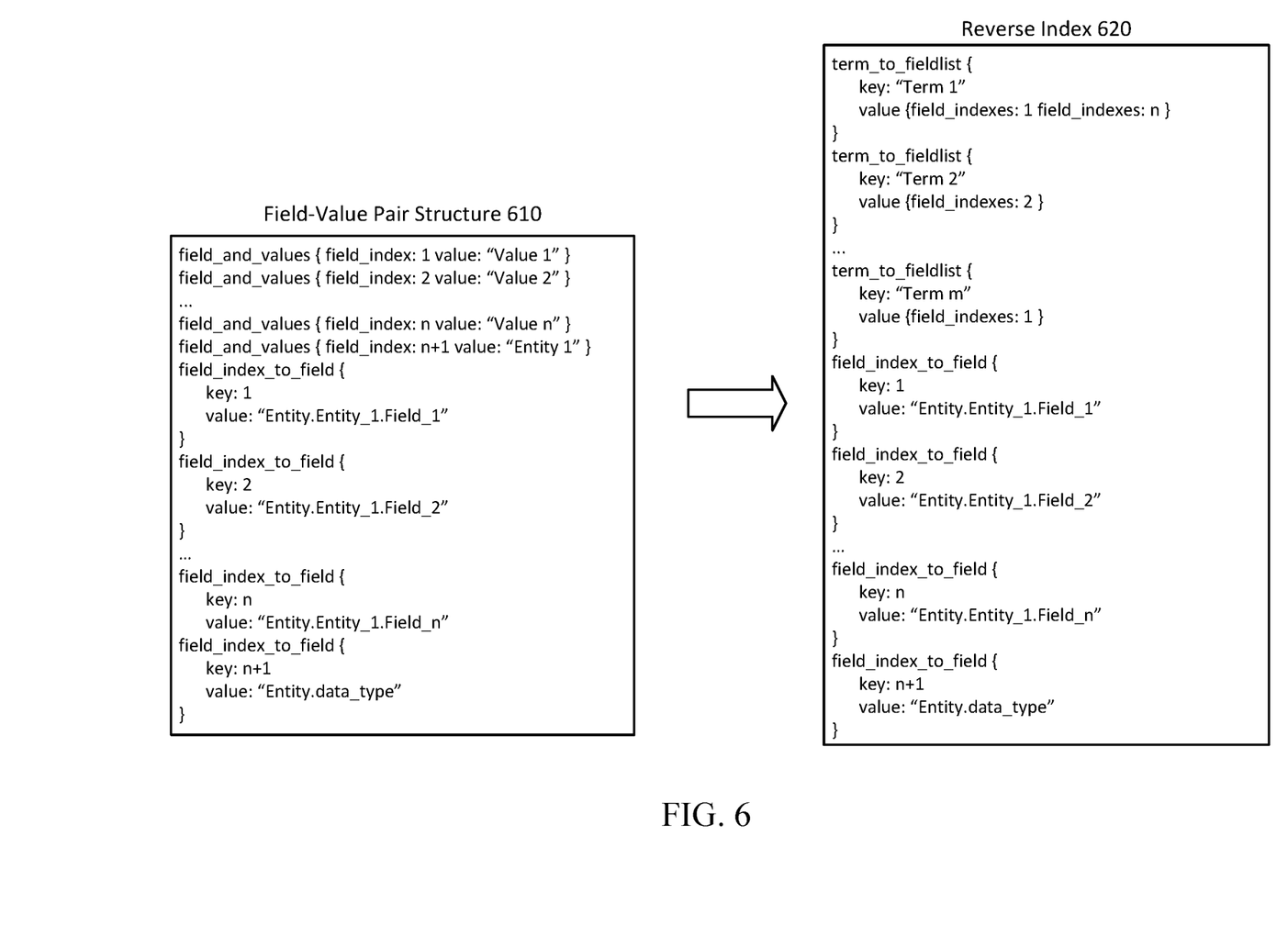
FIG. 6 depicts a block diagram of a reverse index generated from a field-value pair structure according to aspects of the disclosure.

FIG. 6 depicts a block diagram of a reverse index 620 generated from a field-value pair structure 610. The reverse index 620 can include a term-to-field list that maps terms of the values with the field indexes in which they appear. For example, Term 1 appears in the values of Field 1 and Field n, so the term-to-field list for Term 1 includes Field 1 and Field n. As another example, Term 2 appears only in the value of Field 2, so the term-to-field list for Term 2 includes only Field 2. The term-to-field list can include any number of terms, e.g., Term 1 through Term m, with respective values indicating in which fields the term appears.

Figure 7:
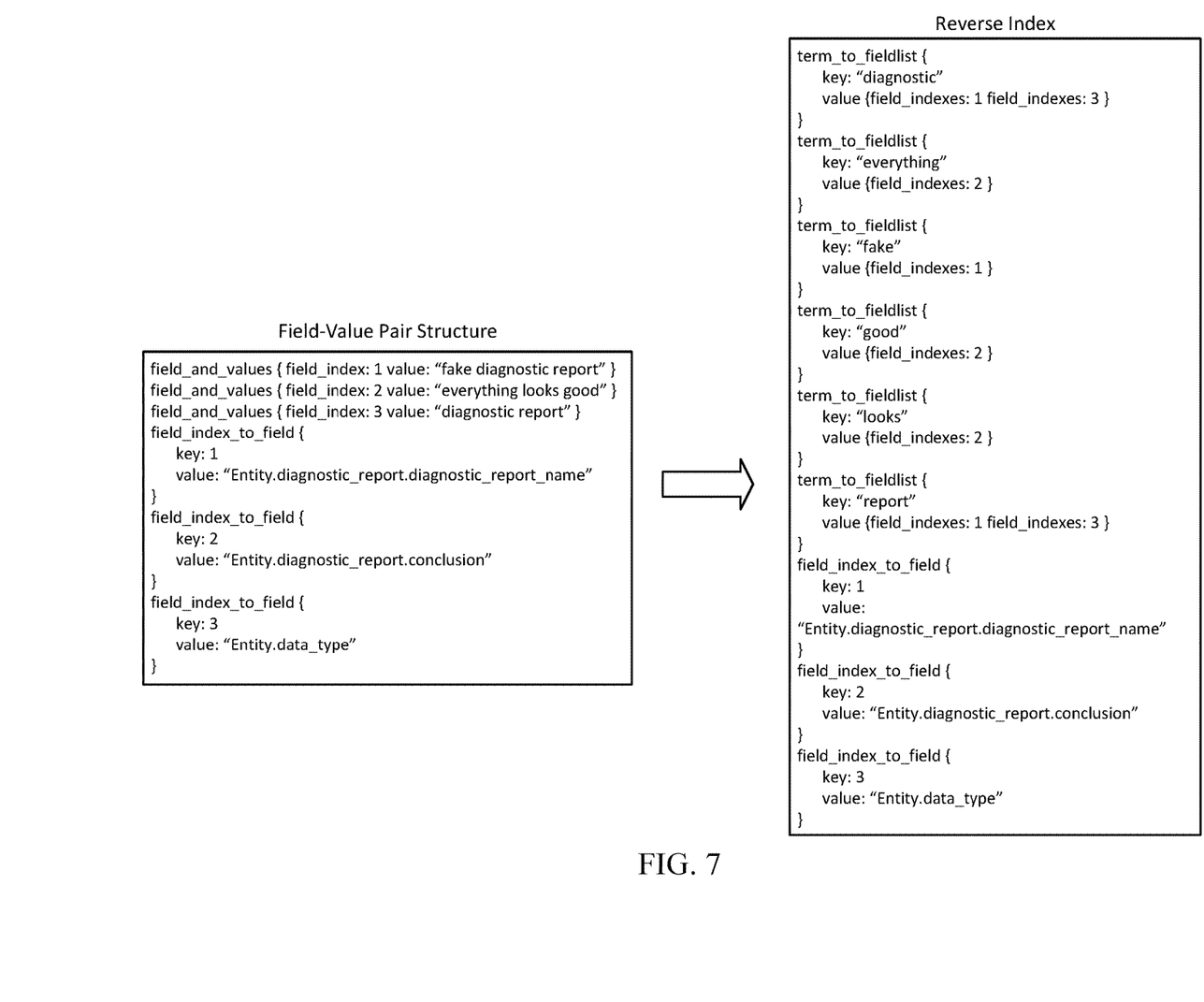
FIG. 7 depicts a block diagram of an example reverse index for the entity "diagnostic report" of protocol buffer data according to aspects of the disclosure.

FIG. 7 depicts a block diagram of an example reverse index for the entity "diagnostic report" of protocol buffer data, described earlier with respect to FIG. 5. The term-to-field list can include the term "diagnostic" mapped with field indexes "1" and "3". The term-to-field list can further include the term "everything" mapped with field index "2". The term-to-field list can also include the term "fake" mapped with field index "1". All other terms can be mapped with the field indexes in which they appear. The reverse index of the field-value pairs can allow for text-searchable protocol buffer data.

Referring back to FIG. 3, as shown in block 340, the format converter 110 can store the reverse index 140 of the converted protocol buffer data at a record level of the database 120. Based on the reverse index 140, a search 150 can quickly identify fields terms in the search.

Figure 8:
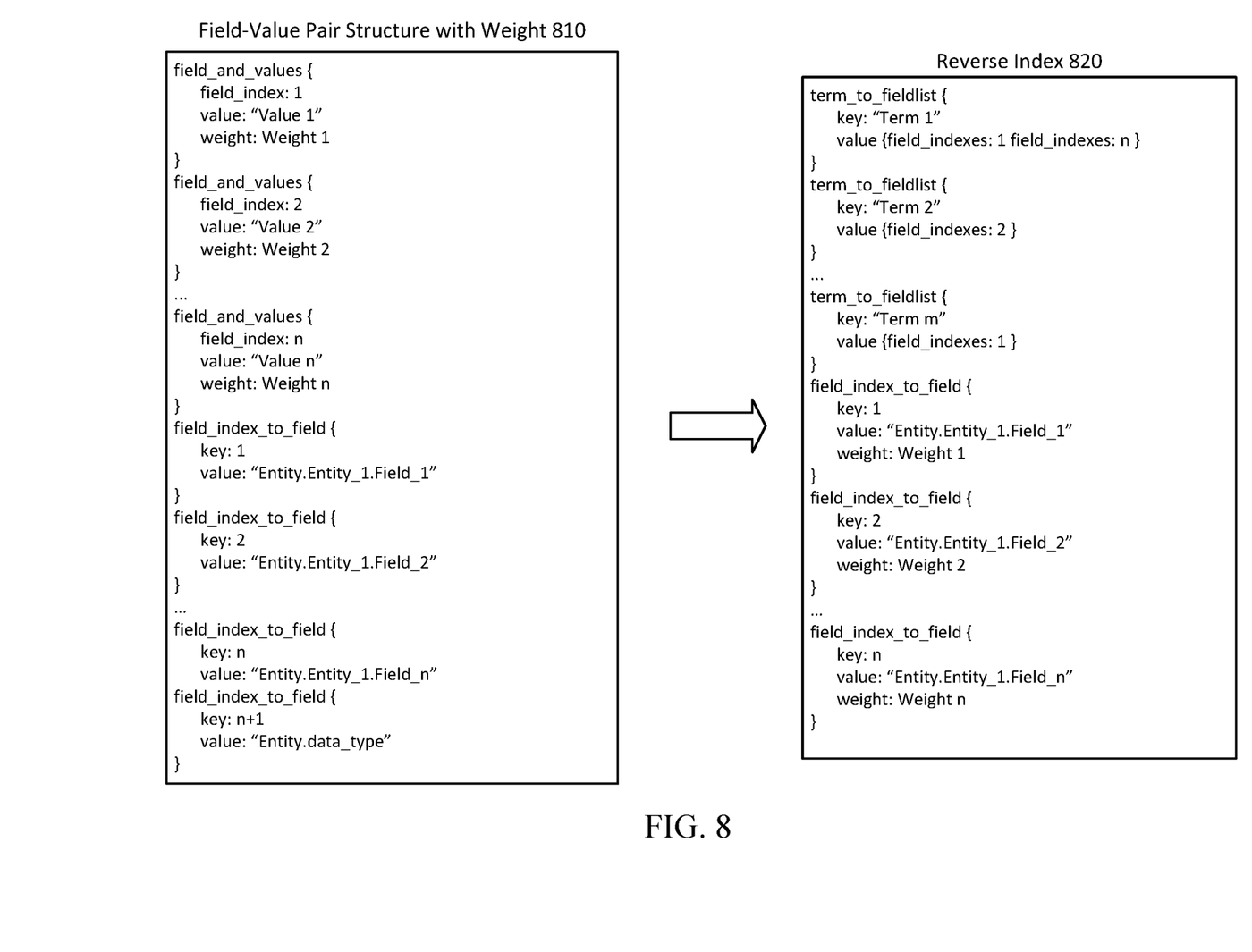
FIG. 8 depicts a block diagram of a field-value pair structure with weights and a reverse index incorporating the field-value pair structure according to aspects of the disclosure.

Field indexes can also be ranked or given a weight by a computing device, such as the client device 160, based on their importance for more accurate search results. For example, more important fields, such as entity titles, can be given higher weights than less important fields, such as comments. An example weight value for a more important field can be 100 and an example weight value for a less important field can be 10. It should be noted that weights could be any numerical value to represent importance for each field. When searching, a ranking score can be determined that is a summation of the weights for each field in which the search term is included. The ranking score can be generated by using the weights for each field through a mathematical model, such as a linear model. FIG. 8 depicts a block diagram of a field-value pair structure with weights 810 and a reverse index 820 incorporating the field-value pair structure 810.

Matched terms and/or related terms can also be highlighted by a computing device, such as the client device 160, based on the reverse index for more accurate search results. Matched terms are terms that are partially or exactly equivalent to terms in a search query. Related terms are terms that are associated with other terms in a query. Whether terms are related can be predetermined prior to a query. Based on a query, the matched and/or related terms can be retrieved for highlighting. The reverse index can show in which fields matched and/or related terms from the query appear using the term-to-field lists.

As such, generally disclosed herein are implementations for building a generic framework to search protocol buffer data. The generic framework can allow for unified indexing so that any protocol buffer data is text searchable. The generic framework can also allow for quickly identifying matched fields of protocol buffer data for queries or query expansions. Protocol buffers generally can support more data types than JavaScript Object Notation (JSON) or extensible markup language (XML).

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for implementing text-searchable protocol buffer data comprising:
receiving, with one or more processors, protocol buffer data comprising adjustable schema and associated values represented in a tree structure;
converting, with a format converter program executed by the one or more processors, the protocol buffer data from the tree structure into a field-value pair structure, wherein adjusted schema and associated values are automatically adopted into the field-value pair structure, a field portion of each field-value pair representing leaf fields of the tree structure and a value portion of each field-value pair representing one or more terms appearing in the respective field;
generating, with the format converter program executed by the one or more processors, a reverse index of the protocol buffer data represented in the field-value pair structure, the reverse index comprising a term-to-field list that maps the one or more terms with the respective fields in which they appear; and
storing, with the one or more processors, the reverse index in a database to be utilized when text-searching the protocol buffer data.

2. The method of claim 1, further comprising:
receiving, with the one or more processors, a search query associated with the protocol buffer data represented in the field-value pair structure;
text-searching, with the one or more processors, the protocol buffer data represented in the field-value pair structure using the reverse index; and
generating, with the one or more processors, a search result for the search query based on the text-searching.

3. The method of claim 1, wherein the field portion of each field-value pair is a field index.

4. The method of claim 3, wherein the field index comprises one of an integer key or a string of characters.

5. The method of claim 1, further comprising generating, with the one or more processors, a weight for the field portion of each field-value pair based on the respective value portion.

6. The method of claim 5, further comprising determining, with the one or more processors, a ranking score for a search result based on a summation of weights generated for the field portion of field-value pairs related to the search.

7. The method of claim 1, further comprising highlighting, with the one or more processors, at least one of matched terms or related terms in a search result based on the reverse index.

8. The method of claim 1, wherein the one or more terms are listed in the reverse index before the respective fields.

9. A system comprising:
one or more processors; and one or more storage devices coupled to the one or more processors and storing instructions associated with a format converter program that, when executed by the one or more processors, causes the one or more processors to perform operations for implementing text-searchable protocol buffer data, the operations comprising:

receiving protocol buffer data comprising adjustable schema and associated values represented in a tree structure;

converting, with the format converter program, the protocol buffer data from the tree structure into a field-value pair structure, wherein adjusted schema and associated value are automatically adopted into the field-value pair structure, a field portion of each field-value pair representing leaf fields of the tree structure and a value portion of each field-value pair representing one or more terms appearing in the respective field;

generating, with the format converter program, a reverse index of the protocol buffer data represented in the field-value pair structure, the reverse index comprising a term-to-field list that maps the one or more terms with the respective fields in which they appear; and storing the reverse index in a database to be utilized when text-searching the protocol buffer data.

10. The system of claim 9, wherein the operations further comprise:

receiving a search query associated with the protocol buffer data represented in the field-value pair structure;

text-searching the protocol buffer data represented in the field-value pair structure using the reverse index; and generating a search result for the search query based on the text-searching.

11. The system of claim 9, wherein the field portion of each field-value pair is a field index, the field index comprising one of an integer key or a string of characters.

12. The system of claim 9, wherein the operations further comprise generating a weight for the field portion of each field-value pair based on the respective value portion.

13. The system of claim 12, wherein the operations further comprise determining a ranking score for a search result based on a summation of weights generated for the field portion of field-value pairs related to the search.

14. The system of claim 9, wherein the operations further comprise highlighting at least one of matched terms or related terms in a search result based on the reverse index.

15. A non-transitory computer readable medium for storing instructions associated with a format converter program that, when executed by one or more processors, causes the one or more processors to perform operations for searching protocol buffer data, the operations comprising:

receiving protocol buffer data comprising adjustable schema and associated values represented in a tree structure;

converting, with the format converter program, protocol buffer data from the tree structure into a field-value pair structure, wherein adjusted schema and associated value are automatically adopted into the field-value pair structure, a field portion of each field-value pair representing leaf fields of the tree structure and a value portion of each field-value pair representing one or more terms appearing in the respective field;

generating, with the format converter program, a reverse index of the protocol buffer data represented in the field-value pair structure, the reverse index comprising a term-to-field list that maps the terms with the respective fields in which they appear; and storing the reverse index in a database to be utilized when text-searching the protocol buffer data.

16. The non-transitory computer readable medium of claim 15, wherein the operations further comprise:

receiving a search query associated with the protocol buffer data represented in the field-value pair structure;

text-searching the protocol buffer data represented in the field-value pair structure using the reverse index; and generating a search result based on the text-searching.

17. The non-transitory computer readable medium of claim 15, wherein the field portion of each field-value pair is a field index, the field index comprising one of an integer key or a string of characters.

18. The non-transitory computer readable medium of claim 15, wherein the operations further comprise generating a weight for the field portion of each field-value pair based on the respective value portion.

19. The non-transitory computer readable medium of claim 18, wherein the operations further comprise determining a ranking score for a search result based on a summation of weights generated for the field portion of field-value pairs related to the search.

20. The non-transitory computer readable medium of claim 15, wherein the operations further comprise highlighting at least one of matched terms or related terms in a search result based on the reverse index.

* * * * *